W. H. MUZZY.
ILLUMINATING AND HEATING DEVICE.
APPLICATION FILED JAN. 15, 1912.
1,132,961.
Patented Mar. 23, 1915.
2 SHEETS—SHEET 1.
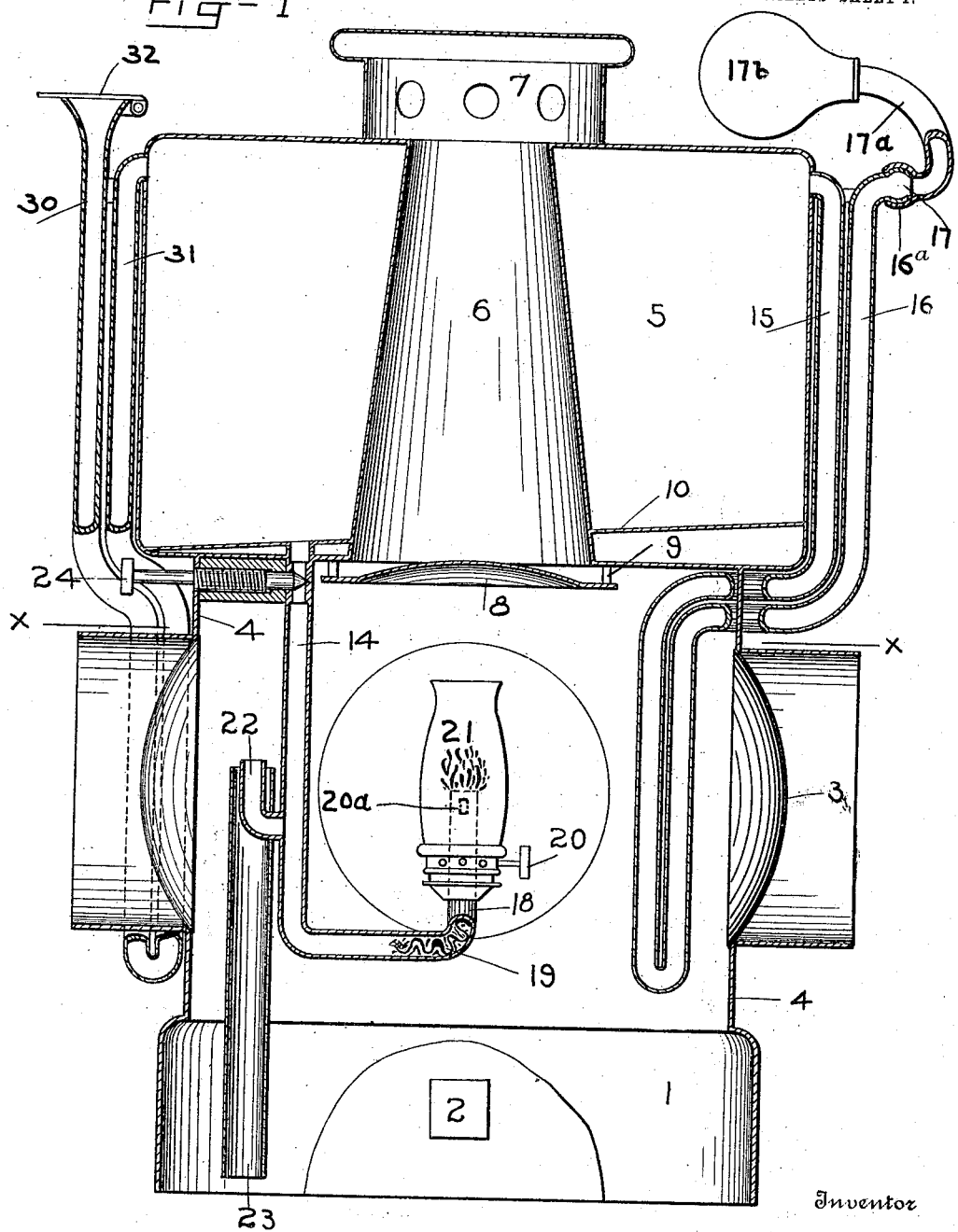

W. H. MUZZY.
ILLUMINATING AND HEATING DEVICE.
APPLICATION FILED JAN. 15, 1912.
1,132,961.
Patented Mar. 23, 1915.
2 SHEETS—SHEET 2.
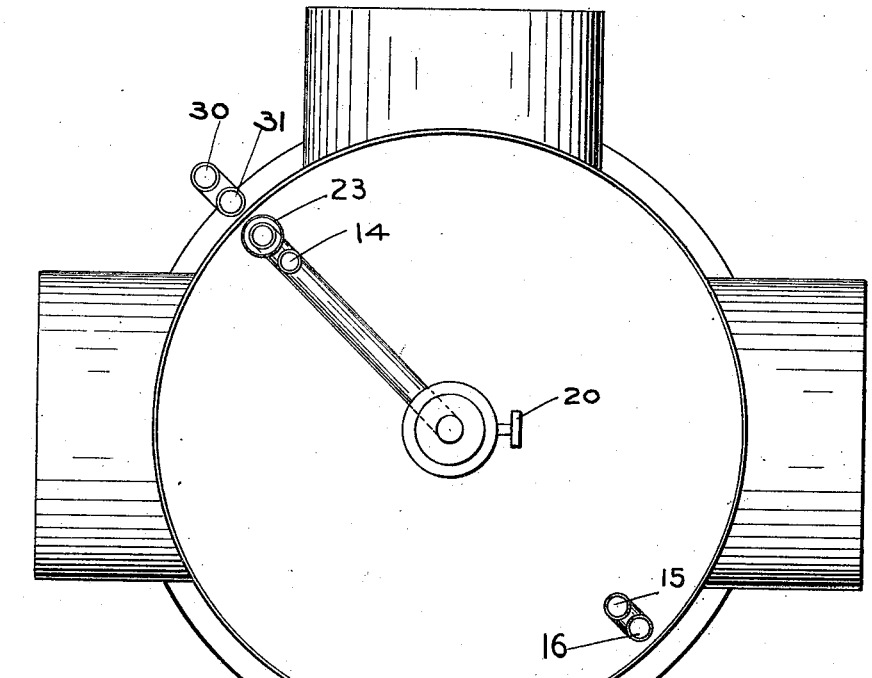
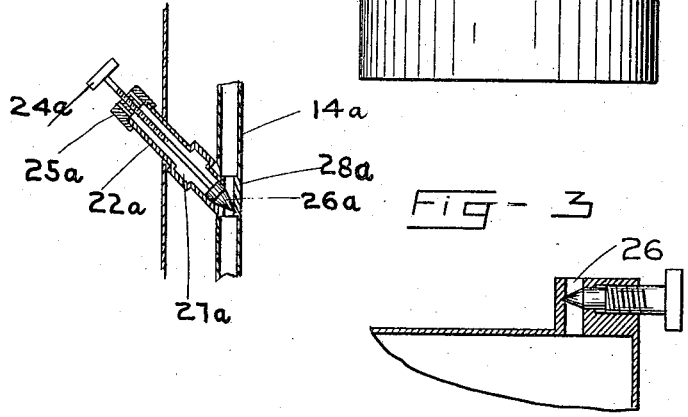
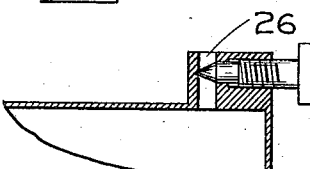
Witnesses
C de Lem
Leona Dawson
Inventor
W H Muzzy

UNITED STATES PATENT OFFICE.

WILLIAM H. MUZZY, OF DAYTON, OHIO.

ILLUMINATING AND HEATING DEVICE.

1,132,961. Specification of Letters Patent. Patented Mar. 23, 1915.

Application filed January 15, 1912. Serial No. 671,249.

*To all whom it may concern:*

Be it known that I, WILLIAM H. MUZZY, a citizen of the United States, residing at Dayton, in the county of Montgomery and State of Ohio, have invented certain new and useful Improvements in Illuminating and Heating Devices, of which I declare the following to be a full, clear, and exact description.

This invention relates to improvements in illuminating or heating devices and has more particular relation to improvements in lamps and especially signaling lamps.

One of the objects of the invention is to provide a lamp that will burn for a maximum period without attention or replenishing the fuel and under extreme varying weather conditions.

Another object of the invention is to provide a lamp that will feed the oil uniformly to the wick irrespective of the depth of oil in the wick-tube until practically all the oil is consumed.

A further object is to provide a top filling tank, and automatically establish and maintain a vacuum in this supply tank by means of the presence of the oil.

Another object is to maintain the temperature of the oil in the supply tank within operative limits even in periods of extreme temperature.

The invention also consists of certain other improvements and has further objects all of which will be clear from the accompanying description and drawings in which latter;

Figure 1 represents a central vertical section, partly in elevation, of a railroad lamp embodying my invention; Fig. 2 represents a horizontal section through this lamp on the line x—x of Fig. 1; Fig. 3 represents a detail vertical section through a modified form of supply tank and Fig. 4 represents a detail vertical section, partly in elevation, of a modified form of valve for the supply pipe.

Heretofore, signal lamps especially as used for railroad work have had a very limited period of burning with one filling of the supply tank due principally to the fact that the tanks are located below the burner and the oil is raised to the burner by capillary attraction in a suitable wick. A small wick is necessary in these lamps and the depth of tank from which such wicks can lift oil by capillary attraction is limited especially when the lamps are subjected to extremely cold temperature as in railroad work. For this reason it is not practical to provide an oil tank of sufficient capacity to keep the light burning for any extended period. To overcome this vital defect I have located my supply tank above the burner and have the oil feed by gravity to the wick tube being held back and allowed to feed as required by the action of a vacuum formed in the oil tank during the process of filling the tank from above.

In the preferred embodiment of my invention shown: 1 represents the base ring of the lamp provided with a clamping bolt 2 by which it is secured to a switch post or semaphore support or other railway or signal device. This lower ring and the lenses 3 and supporting frame 4 are substantially similar to railroad lamps now in use in the United States and need no further description here.

The oil tank 5 is supported on the frame 4 and closes the top of the chamber formed by this frame. In order to provide the necessary ventilating flue for the lamp, the tank 5 is formed with a central tapering flue 6 capped at the top with an apertured rain hood 7 and guarded at the bottom with a concave baffle plate 8 just above the top of the burner, but spaced from the bottom of the tank by hangers 9. The heat from the burner is thus trapped and spread over the bottom of the tank and finally passes up the tapering flue. This construction results in the oil in the tank being kept at an even temperature.

The tank proper is provided with a false bottom 10 inclined toward one side so as to drain all the oil toward one edge even if the lamp is mounted in an inclined position as it often is as when used on bell buoys, etc. This false bottom also forms a heating chamber that will retain the hot air even when the lamp is subjected to a high wind that might force through the lamp and momentarily blow the hot air away from the real bottom of the tank.

The tank 5 is filled through a pipe having two parts 30 and 31 mounted beside the tank; the upper open end of pipe 30 being formed into a funnel and closed by a loose hinge lid 32 not air tight. The tube 31 enters tank 5 near the top and the tubes 30 and 31 extend below the breathing level of the burner. The lamp supply tube 14 projects downward from the tank near its lowest point. The result of this construction is that when oil is poured in the tube 30 it will rise in the tube 31 until it enters the tank. No further oil can enter the tank 5 which is closed until the air therein is released. This release takes place through tube 15 leading from the upper part of tank 5 and passing downward through the lamp frame to below the lower level of pipe 14 and thence back on itself as at 16 to oil level of the tank when the latter is full. The upper end is formed into a horizontal mouth piece or attaching nipple 16a for blowing the oil out of pipes 15 and 16. When the tank is completely filled the oil runs down the tube 15 and up the tube 16 until it is the same level in both tubes as in the tank. This also finally seals the tank making it air-tight.

The tube 14 passes downward and inward to the wick tube 18 into which the cylindrical wick 19 projects; the wick being controlled by any suitable raising and lowering means 20. The usual globe 21 is also mounted about the upper end of the wick. The tube 14 is further provided with a branch pipe 22 which I will term a breathing pipe. This pipe connects with pipe 14 at the same level it is desired to hold the oil in the wick tube 18. The upper end of the pipe 22 projects into a drain pipe 23 which extends down through the bottom of the lamp. There are times, as when the lamp is being filled when some slight leakage of oil takes place from tube 14. The tube 23 conducts such oil out of the lamp and no damage results. Valve 24 in tube 14 is closed when the tank is being filled as at this time there is no vacuum in the tank 5 to hold back the oil.

The operation of the lamp is as follows: When the lamp becomes empty after being once filled the oil will still remain in tubes 15 and 31 and partly in tube 16 and 30 and prevents air entering through these tubes. To fill, first close valve 24, then blow in mouth piece 17 and all the oil from tubes 15 and 16 will pass into the tank 5. The air in the tank during this process escapes in bubbles through partially filled pipes 31 and 30. I have shown a rubber bulb 17b with rubber pipe 17a attached to nipple 16a to draw or force by suction or pressure sufficient oil out of pipes 15 and 16 to break the air trap. The bulb and tube are then detached. The tubes 15 and 16 are now clear to allow the escape of air as the tank is filled through tubes 30 and 31. When the tank becomes full the tubes 15 and 16 again fill with oil which seals them. When valve 24 is opened the oil will pass down tube 14 until a vacuum is created in tank 5. A small quantity of this oil will overflow at breathing tube 22 before a sufficient vacuum is established to retard the flow of oil as the suction in the tank will cause the oil to lower in tubes 16 and 30 by part of the oil in tubes 15 and 31 passing into the tank until the oil in tubes 15 16 and 30 and 31 balances oil in tube 14. As the oil is used in tube 18 the oil in the upper part of tube 14 does not move down but is held suspended in the upper part of said tube by the vacuum in tank 5. When the level of oil in the lower part of tube 14 reaches the level of the entrance of tube 22 air passes up the breathing tube 14, through the oil, in bubbles and relieves the vacuum in tank 5. The oil then passes down into the lower part of tube 14 and again closes tube 22 by passing into it. The air is thus stopped from reaching tank 5 and no further oil is fed until the level of oil in tube 18 and lower part of tube 14 again recedes below opening of tube 22.

As a matter of observation the oil in tube 18 does not change level sufficiently for the naked eye to observe as the covering and uncovering of the opening of tube 22 as the lamp consumes oil causing very slight changes in level.

The tank 5 is of sufficient capacity to enable the lamp to burn for at least 30 days without attention and on one filling. As the oil is fed from the bottom of the tank by gravity a uniform grade of oil reaches the wick which is so short that it has no difficulty in raising very inferior grades of oil even in zero weather. The shortness of the wick and having the oil always at the same level in the wick tube 18 allows the most perfect capillary action and overcomes the usual objection to large tanks below with long wicks; i. e. the lighter oils in such tanks are raised by capillary attraction first and the lamp as it burns becomes less and less efficient as the heavier portions of the oil are reached until the lamp is extinguished by lower temperature before all the oil is consumed. By reference to Fig. 2 it will be seen that the tubes 14 and 15 and 16 and 30 and 31 pass down between the lenses and thus do not obstruct the lights.

In Fig. 3 I have shown a valve 26 as a modified form of device to release the air from tank 5 as it is being filled; the valve then being closed and thus sealing the tank. With this valve the tubes 15 and 16 would not be necesary but there of course would not be any automatic action of the air vent nor an automatic oil seal as is secured by the tubes 15 and 16.

In Fig. 4 I have shown a modified form of valve 26a to take the place of valve 24 the object being to prevent any possible leakage of air to the tank 5 as might occur if valve 24 worked loose. This valve 26a is mounted in an inclined tube 22ª bearing the same relation to tube 14ª as tube 22 bears to tube 14. The tube 22ª has an enlarged chamber 27ª which allows the passage of air and oil to the outer open end of the tube when the valve is open. When the valve is screwed down by its milled knob 24ª the head of the valve passes into the narrow portion of tube 22ª and also seats on a valve seat 28ª in tube 14ª and closes this latter tube also. This valve is open when the lamp is operating and there is no point for air or oil leaks. When the valve is closed during the filling process any slight leakage would only result in the waste of a few drops of oil.

It will be understood that when the lamp is in operation the oil is fed to the wick tube by gravity and is held back by the vacuum in tank 5. The tank is sealed by oil and there are no mechanical joints of any kind to leak oil or air as there are no working parts that may become worn or leaky. The level of the oil in the burner tube always remains the same and does not vary as the level of the oil in the tank is lowered. The bulb 17ᵇ is compressed and applied to the nozzle 17 and its release is sufficient to remove enough oil from tubes 15 and 16 to break the trap and allow the tank to be filled when it automatically seals itself. Further the invention is applicable to all conditions where it is desired to have an elevated tank of oil, gasolene or other fuel and feed to any device where fuel is to be used, such for instance as a carbureter of a gas engine or automobile. In such use the needle valve tube of the carbureter would take the place of the burner tube and the troublesome float valve would be eliminated.

It will of course be understood that my invention can with equal facility be used not only for lamps but for stoves and other forms of illuminating and heating mechanisms.

It will of course be understood that the invention is not limited to burners having wicks as the oil or gasolene can be fed to any type of oil or oil-gas burner or other utilizer with equal facility.

Having thus described one embodiment of my invention, to which I do not wish to be limited, what I claim as new and desire to secure by Letters Patent is:

1. The combination with a sealed oil tank, of a filling pipe for the tank formed with an oil trap, an independent air vent pipe formed with a permanent oil trap and connected at one end to the tank; the opposite end being open, means for removing the oil from the air vent pipe at will and a combined oil feed and breather pipe connected to the tank and extending below the same.

2. The combination with a sealed oil tank, of a filling pipe for the tank formed with an oil trap, an independent air vent pipe formed into a pendant oil trap loop and connected at one end to the tank near the top; the other end of the pipe being open to the air on a level near the top of the tank and an oil feed pipe connected to the tank and extending below the same.

3. The combination with a sealed oil tank, of a filling pipe for the tank formed with a permanently sealing oil trap, an independent air vent pipe formed with a permanently sealing oil trap and connected to the tank, means for removing the oil from the air vent pipe at will and an oil feed pipe connected to the tank and extending below the same.

4. The combination with a sealed oil tank, of a filling pipe for the same formed with a permanently sealing oil trap, an independent air vent pipe formed with a permanently sealing oil trap and connected to the tank near its upper end, a pump for removing the oil from the air vent pipe at will, and an oil feed pipe connected to the tank and extending below the same.

In testimony whereof I affix my signature in the presence of two witnesses.

WILLIAM H. MUZZY.

Witnesses:
C. DE LEON,
LEONA DAWSON.